United States Patent [19]

Woo

[11] Patent Number: 5,450,375

[45] Date of Patent: Sep. 12, 1995

[54] GEOPHONE SHOCK ABSORBER

[75] Inventor: Daniel M. Woo, Missouri City, Tex.

[73] Assignee: Shaw Industries Limited, Rexdale, Canada

[21] Appl. No.: 277,603

[22] Filed: Jul. 20, 1994

[51] Int. Cl.$^6$ .......................................... H04R 11/00
[52] U.S. Cl. ..................................... 367/188; 367/187
[58] Field of Search .............. 367/183, 187, 182, 185, 367/188

[56] References Cited

U.S. PATENT DOCUMENTS

| | | |
|---|---|---|
| 2,748,370 | 5/1956 | Baltosser . |
| 2,947,529 | 8/1960 | Schwartz et al. . |
| 3,170,736 | 2/1965 | Wright . |
| 3,344,397 | 9/1967 | Elliott et al. . |
| 3,602,490 | 8/1971 | Mueller et al. . |
| 3,628,383 | 12/1971 | Tikanen et al. . |
| 3,738,445 | 6/1973 | Wilson et al. . |
| 3,742,441 | 6/1973 | Riley . |
| 3,913,063 | 10/1975 | Sears . |
| 3,953,829 | 4/1976 | Boyle . |
| 4,144,520 | 3/1979 | McNeel . |
| 4,152,692 | 5/1979 | McNeel . |
| 4,159,464 | 6/1979 | Hall, Jr. . |
| 4,285,054 | 8/1981 | McNeel . |
| 4,323,994 | 4/1982 | Coogler . |
| 4,458,344 | 7/1984 | Coogler . |
| 4,504,932 | 3/1985 | Sundt . |
| 4,623,991 | 11/1986 | Vitringa . |
| 4,685,094 | 8/1987 | Vitringa et al. . |
| 5,119,345 | 6/1992 | Woo et al. . |
| 5,134,594 | 7/1992 | Woo . |

FOREIGN PATENT DOCUMENTS

| | | |
|---|---|---|
| 0184231 | 6/1986 | European Pat. Off. . |
| 1508348 | 4/1978 | United Kingdom . |

*Primary Examiner*—Stephen C. Bentley
*Assistant Examiner*—Christopher K. Montgomery
*Attorney, Agent, or Firm*—Vaden Eickenroht, Thompson & Feather

[57] ABSTRACT

A geophone is disclosed that has a cylindrical housing closed at one end by a bottom and the other end by a top. A magnet assembly with pole pieces at each end of the magnet is centrally mounted in the housing providing an annular space between the magnet assembly and the housing. A coil form is located in the annular space. Springs support the coil form for axial movement relative to the magnet assembly along the longitudinal axis of the housing. Washers are included on the upper and lower sides of each of the springs to enhance the life span of the springs by reducing the damage caused by torsional forces experienced by the springs during normal operation and rough handling. Also incorporated in the geophone are resilient members mounted between the coil form and the housing to prevent the coil form from directly hitting the housing and thereby reduce the amount of frequency shift experienced by the geophone over its life span.

13 Claims, 4 Drawing Sheets

GEOPHONE SHOCK ABSORBER

This invention relates generally to geophones and, more particularly, to mechanisms to reduce the signal distortion and frequency shifts in geophones.

Geophones are devices that sense motion by suspending an inertial reference mass structure from a rigid, fixed, supporting structure or housing. Typically, the mass is an annular coil form suspended by springs in the annulus between a magnet assembly and the housing of the geophone. Usually, one spring is attached at each end of the coil form. The springs position the coil form within the magnetic field of the magnet assembly so that the coil form is centered laterally and along the axis of the magnetic field. The springs also form a suspension system having a predetermined resonant frequency.

In seismic operations, seismic waves are imparted into the earth's crust at or near the earth's surface and portions of those seismic waves are reflected or refracted from the boundaries of subsurface layers. Geophones are arranged in arrays or groups on the earth's surface. When reflected or refracted waves encounter a geophone, the coil form, which is suspended between the two springs, tends to lag behind as the geophone housing and its connected magnet assembly moves with the earth's surface. The springs then move the coil form back and forth like a pendulum in the magnetic field. The movement of the coil form through the magnetic field of the magnet assembly causes a voltage to be generated at the output of the geophone. The outputs of the arrays of geophones are recorded in a form that permits skilled interpreters to discern from an analysis of the resolved outputs the shape of subsurface formations.

In present day geophones, spider springs are used extensively to support the coil forms of the geophones. Such springs are usually made from discs of spring material and typically have an inner ring and an outer ring that are connected by a plurality of legs. The legs are formed by etching or stamping away grooves in the spring material in accordance with a predetermined pattern. Generally, three such legs are used, and the three-legged arrangement is generally considered the most advantageous.

The legs of geophone spider springs usually have a rectangular cross-section and are curved along their lengths between the junctures with the inner and outer rings of the spring. After etching, the spring is "preformed" according to known techniques. When preforming is complete, the inner ring is offset or displaced relative to the outer ring, such that when the coil mass is suspended between two such springs, the inner ring, legs, and outer ring of each spring lie essentially in the same plane.

A geophone is intended to sense motion from a direction that is roughly parallel to the axis of movement of the coil form with respect to the geophone housing. Therefore, it is desirable to eliminate or minimize the effects of any lateral motion of the coil form in response to forces that are not parallel to the axis of movement of the suspended coil form within the geophone.

In seismic operations, an impulse that is not truly parallel with the geophone axis and that contains a frequency component at or very near to that of the spurious frequency causes the geophone to produce an undesired or false EMF in the coils. Because of its high Q, the movement will continue for some time after the force that caused it has subsided. This resonance is considered to be the main spurious frequency in a geophone and it is highly undesirable as it limits the geophone's upper clean bandwidth.

Inasmuch as the geometry and the mass of the coil form for a given model of geophone are fixed within manufacturing limits, the spurious resonance is also fixed. The frequency of the spurious resonance can therefore only be raised or lowered practically by changing the geometry of the suspension springs. This characteristic has been used to raise the frequency of these false signals until they are beyond the desirable frequency spectrum of the geophone by increasing the lateral stiffness of the spring. With this approach, these false signals do not interfere with or corrupt signals of interest. Examples of springs that produce a high frequency spurious response are shown in U.S. Pat. Nos. 4,323,994, 4,458,344, 4,623,991, and 5,134,594. However, as the lateral stiffness of the springs increases, so does the susceptibility to damage due to lateral shock, torsional forces, and axial shock experienced primarily during rough handling, including testing and installation.

The life span of a geophone is measured by the integrity of the signal produced during normal operation. Distortion in the produced signals usually results from damage to the suspension system due to lateral and axial shocks and the torsional forces. Rough handling tends to a have a more significant effect on rotational type geophones, rather than pig-tail type geophones, due to the unique configuration of the geophone.

In order to monitor the signals produced by a rotational type geophone, generally, an electrical connection is made from one external conductor, through one of the springs, which is isolated from the magnet assembly, through the coil form to the other spring, which is electrically connected to the magnet assembly, which in turn is connected to a second external conductor. A contact ring or the like electrically connects the spring that is isolated from the magnet assembly to the external conductor by a pressure connection. Likewise, a pressure ring is used to effect the electrical contact between the magnet assembly and the other spring. The electrical connection between the coil form and these springs is typically effected by pressing the springs against a conducting surface of the coil form using snap-rings or the like.

Even though the springs are capable of rotating freely relative to the magnet assembly, the pressure from the contact ring and the pressure ring causes resistance to rotational movement of the springs. Therefore, any torsional forces imposed on the inner ring section when the outer ring section moves with the coil form in the annular space is concentrated on the area of the spring that is not restricted from movement, including the arms, which reduces the life span of the spring.

U.S. Pat. No. 4,685,094 discloses the typical rotational type geophone shown in FIG. 1, incorporating a lateral compliance device in order to make the spring less susceptible to lateral shock. This geophone is comprised of typical geophone components including geophone housing 102 with magnet assembly 104 rigidly mounted therein to create an annular space 106 between the two structures. Coil form 108 is suspended by springs 10 and 12 for reciprocating movement in annular space 106. The lateral compliance device includes a contact ring 11, which is used to press first spring 10 against pole piece 14 of the magnet assembly from above the spring and pressure ring 16 to press spring 12 against pole piece 20 from below the spring.

Even though this patent emphasizes that it is the frictional effect between the spring and pole pieces that provides the lateral compliance, a very thin disc of insulating material is necessary between spring 10 and pole piece 14 in order for the geophone to function. The disc, however, does not significantly reduce the destructive effect of the torsional forces described above. In addition to experiencing the destructive torsional forces, this geophone produces distortion due to non-linearity in the system stemming from the minute movement of the pressure ring by gravity acting on the coil form. The distortion results from the non-symmetrical frictional forces acting on the springs.

It is known that the axial shock imparted on a coil form by the collision of the ends of the coil form and the top and the bottom closure member during rough handling produces a frequency shift in the geophone signal. U.S. Pat. No. 4,685,094 discloses an axial shock absorbing device that prevents this from happening by shoulder 24 on the coil form between the pole pieces so the shoulder will hit one of the pole pieces and prevent the coil form from hitting the housing. However, this type of shock absorbing device can only be used where the pole pieces are assembled after the coil form is positioned around the magnet.

With the technological advances in the signal recording equipment and the advent of the 24 bit digital recording system, the geophone distortion and spurious response are the limiting factor of the dynamic resolution and high frequency resolution of the recording system. Therefore, it is necessary to decrease the amount of distortion produced by the spring in addition to achieving a high frequency spurious response. The improved recording equipment also makes it necessary to reduce the amount of frequency shift over the useful life of the geophone.

Therefore, it is a feature of this invention to provide a geophone suspension system that is less susceptible to torsional forces generated during nominal operation and rough handling of the geophone.

It is a further object of this invention to provide a geophone with two disc-shaped springs positioned on opposite sides of the magnet assembly for supporting the coil form for longitudinal movement relative to the magnet assembly, wherein the springs are positioned between an isolation washer and conducting washer both mounted for rotational movement with the springs, so that the springs are bound on the upper and lower sides by surfaces that are free to rotate relative to a stationary surface, thereby allowing the springs to rotate in response to the torsional force imposed on the springs by the reciprocating coil form, thereby reducing the stress imposed on the spring arms by the torsional force.

It is yet another object of this invention to provide a geophone axial shock absorber to reduce the frequency shift to 2.5% over the useful life of the spring.

It is still another object of this invention to provide a geophone including resilient shock absorbers mounted between the coil form and the geophone housing for preventing the coil form from directly contacting the housing during rough handling to reduce the shock imparted thereon.

These and other objects, advantages, and features of this invention will be apparent to those skilled in the art from a consideration of this specification including the attached drawings and appended claims.

Figure 4:
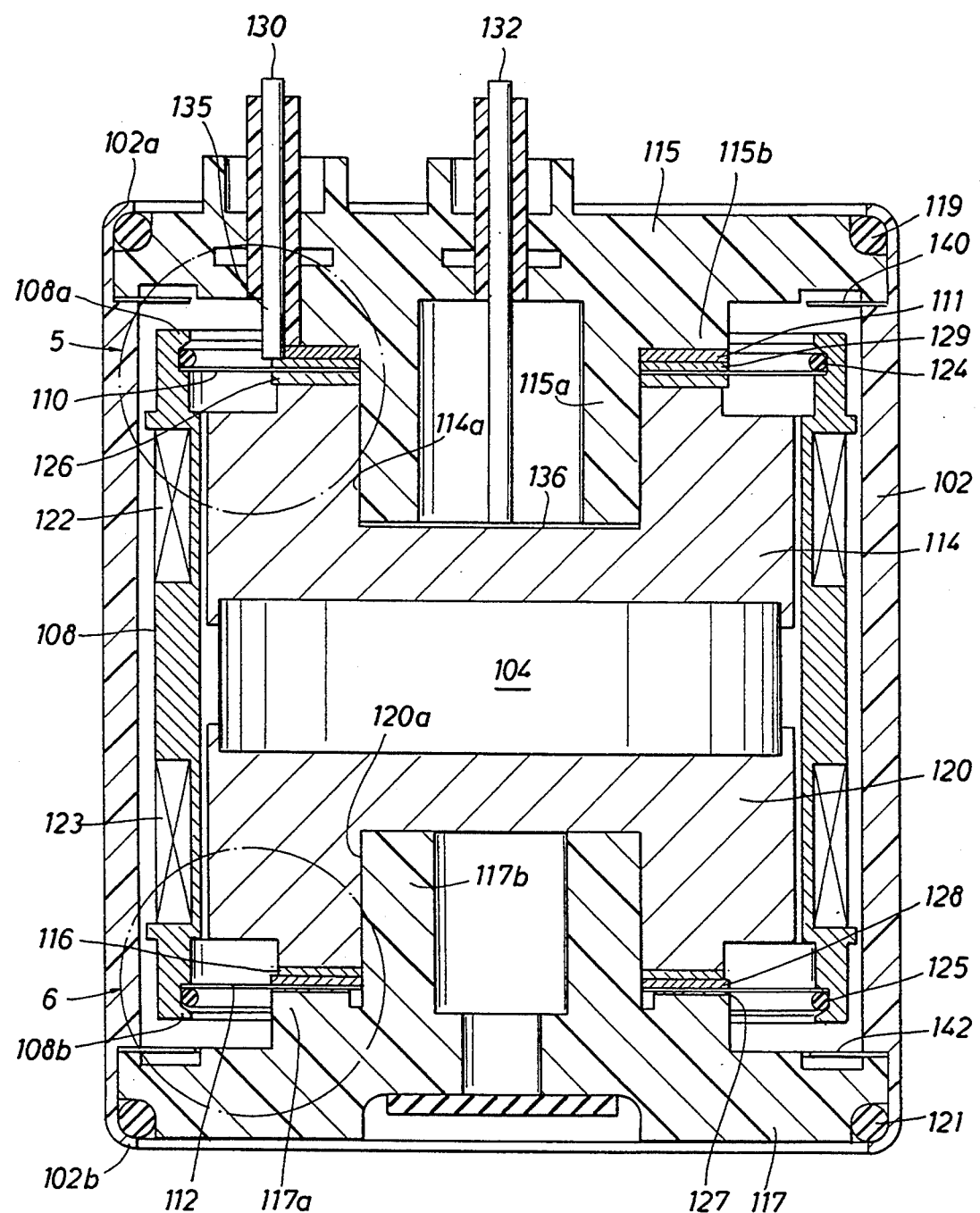
FIG. 4 is a vertical, cross-sectional view through a geophone embodying the construction of this invention.

The geophone shown in FIG. 4 includes a permanent magnet assembly consisting of magnet 104 having pole pieces 114 and 120 positioned at each end of the magnet. The magnet assembly is mounted in housing 102. Coil form 108, on which wire coils 122 and 123 are wrapped, is supported in the annular gap between the magnet and the case by springs 110 and 112. A magnetic field is established between poles 114 and 120 and housing 102. Coil form 108 is supported for movement relative to the longitudinal axis of the housing in the annular gap by springs 110 and 112, so that coils 122 and 123 will move relative to the magnet and the housing in response to received seismic energy and produce a voltage that is proportional to the relative velocity of the coil with respect to the magnet.

Springs 110 and 112 are spider springs made from thin discs of spring material, usually beryllium copper, having inner and outer rings connected by relatively thin, arcuate spring arms.

Housing 102, top housing closure member 115, and bottom housing closure member 117 are made of non-conducting material. The top and bottom housing closure members are held in place in opposite ends of the housing by O-rings 119 and 121 and the shoulders 102a and 102b of the housing.

Figure 6:
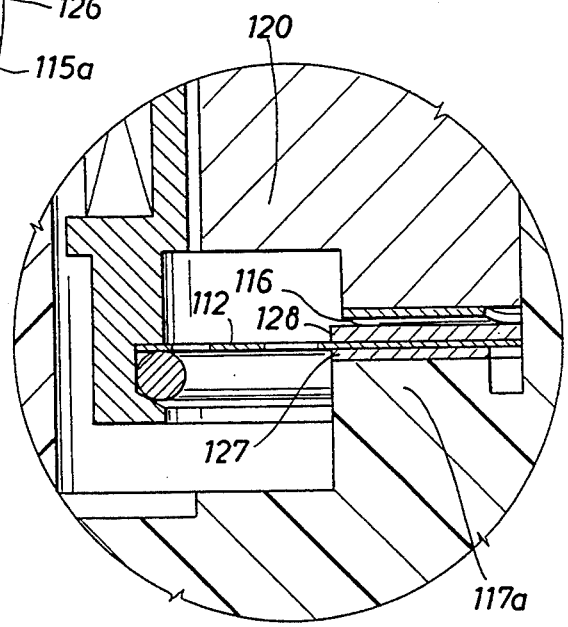
FIG. 6 is a sectional view of an enlarged scale of the lower spring assembly within circle 6.

As shown in FIG. 6, spring 112 is pressed against a polyester insulating washer 127, which can rotate freely relative to the spring and bottom housing closure member 117, and thus, boss 117a of bottom member 117 by annular spring 116. Copper washer 128, which can also rotate freely relative to the spring and pole piece 120, is positioned between annular spring 116 and spring 112. Pole piece 120 has centrally located blind hole 120a that is positioned over central boss 117b of the bottom support member and is in electrical contact with annular spring 136 and thus spring spider 112.

Upper pole piece 114 is electrically isolated from spring spider 110 by insulation ring 126, which moves relative to both spring 110 and pole piece 114. Contact ring 111 encircles cylindrical boss 115a located in blind hole 114a of pole piece 114. The contact ring is clamped between annular shoulder 115b of the top housing closure member and copper washer 129 to electrically connect the contact ring to spring 110.

Terminals 130 and 132 are molded into top housing closure member 115. Terminal 130 is in electrical contact with spring 110 through contact ring 111 and conductor 135. Spring 110 is electrically connected to silver plating on aluminum coil form 108 by means of retainer ring 124 that is held in place by coil form shoulder 108a. Coils 122 and 123 are soldered to the silver plating on the aluminum coil form between the two coils. Therefore, the coils are electrically connected to terminal 130. Spring 112 is also electrically connected to the silver plating of coil form 108 on the end opposite from spring 110 by a retainer ring 125 held in place by shoulder 108b and is electrically connected to pole piece 120 through spring 116. Pole piece 120 is electrically connected to terminal 132 through permanent magnetic 112 and pole piece 114. Conductive contact material 136 is placed between terminal 132 and pole piece 114 in order to enhance the electrical contact.

Figure 1:
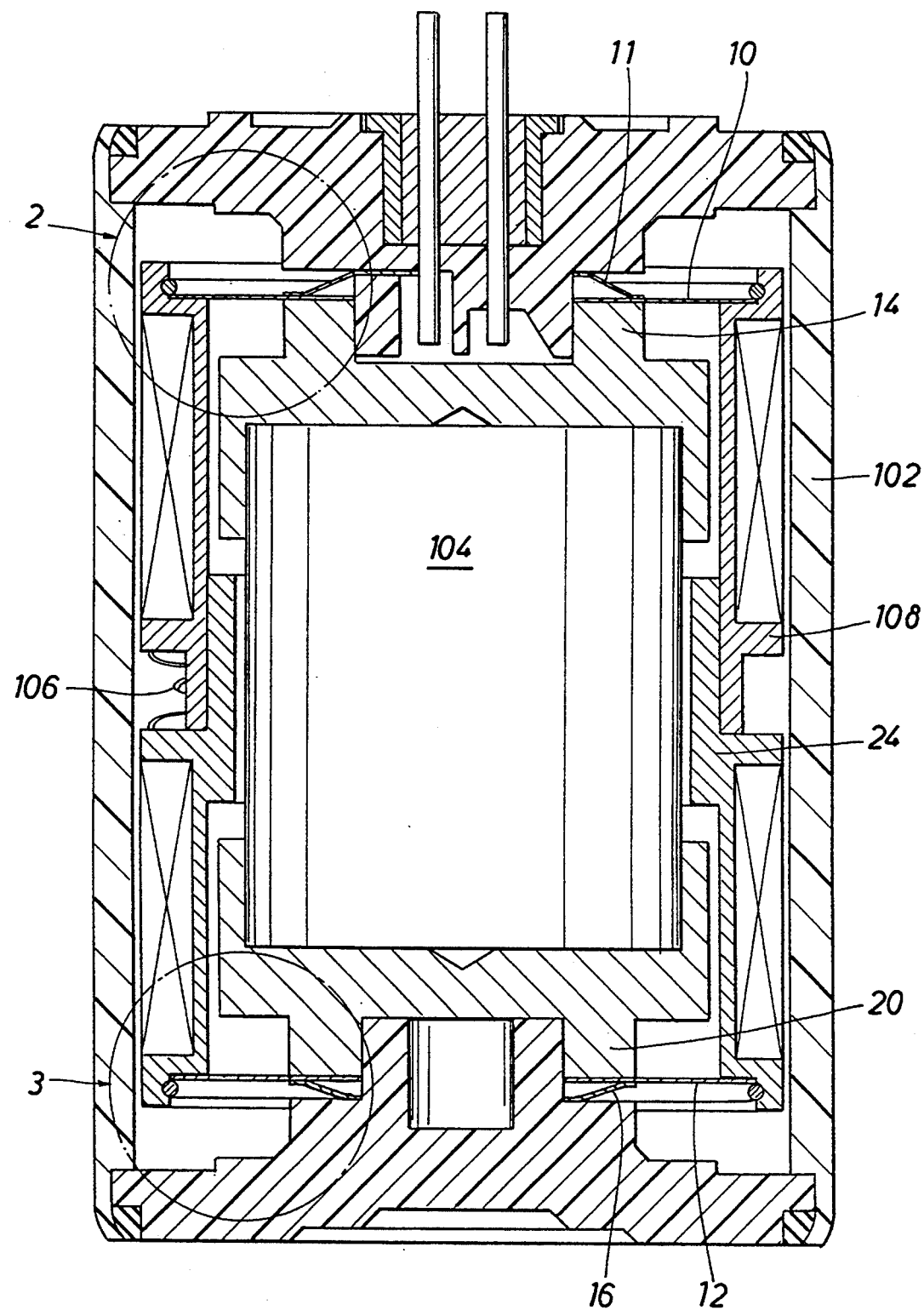
FIG. 1 is a vertical, cross-sectional view through a prior art geophone.
Figure 2:
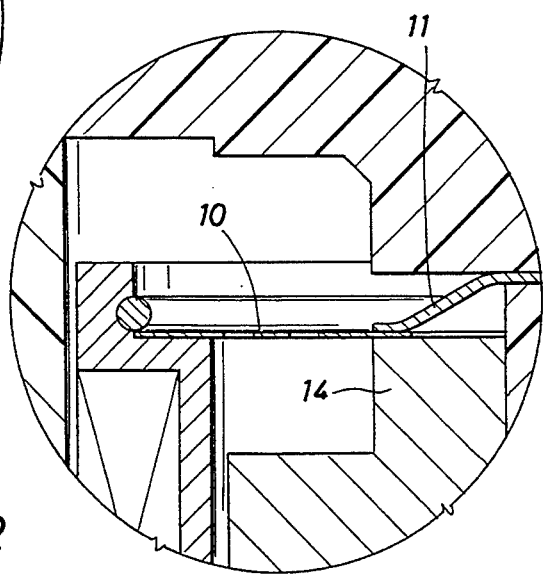
FIG. 2 is a sectional view on an enlarged scale of the upper spring assembly within circle 2.
Figure 3:
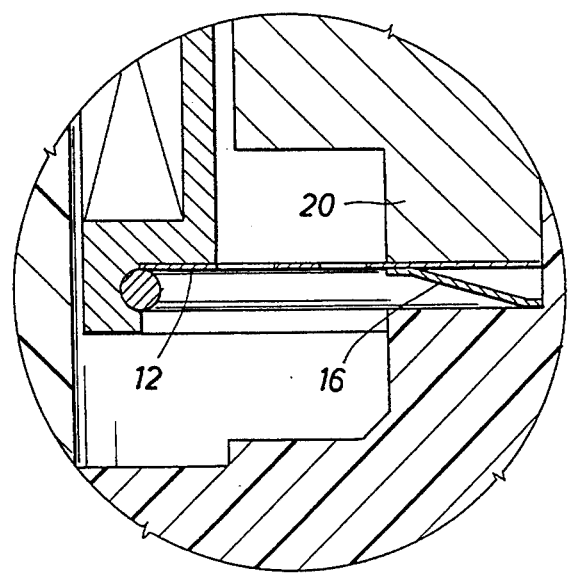
FIG. 3 is a sectional view of an enlarged scale of the lower spring assembly within circle 3.

It is the washer-spring-washer configuration of this suspension system that reduces the susceptibility of the suspension system to the torsional forces described above. FIGS. 2 and 3 show, on an enlarged scale, cross-sectional views of the prior art suspension systems shown in FIG. 1. Springs 10 and 12 are pressed into direct contact with pole pieces 14 and 20 by contact ring 11 and pressure ring 16, respectively. It is the frictional force between the respective springs and pole pieces that hold the springs from rotating in response to the torsional forces imposed on the springs by rough handling that stress the spring arms beyond the yield point and change the spring rate of the springs.

Figure 5:
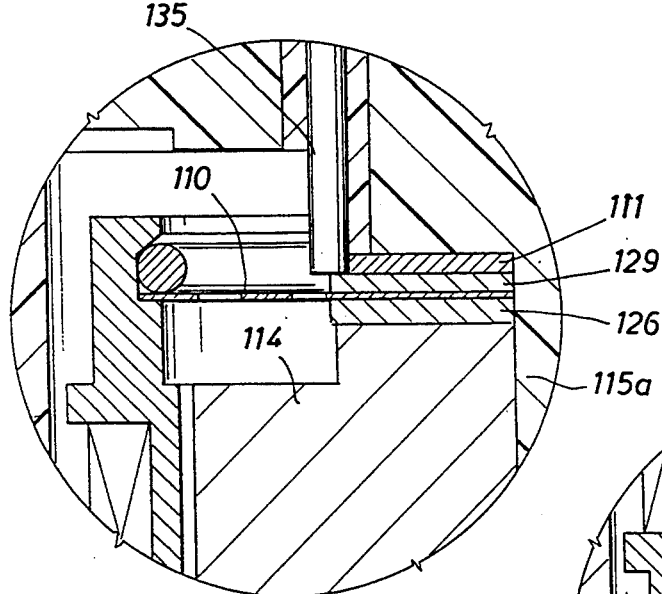
FIG. 5 is a sectional view on an enlarged scale of the upper spring assembly within circle 5.

On the other hand, washers 126 and 129 in the embodiments of this invention shown in FIGS. 5 and 6 are free to rotate with springs 110 and 112 relative to the stationary portions of the geophones, including top housing closure member 115 and pole piece 114. Since the washers are capable of rotating relative to the stationary members, the torsional forces on spring 110 are significantly reduced. Using washers made of materials that lower the coefficient of friction between the spring and pole piece 114 also contributes to the reduction in the torsional forces imposed on the springs. Therefore, washers that are made of materials having a lower coefficient of friction than pole 114 are preferable. Since spring 112 is also bound by washers capable of rotating freely with respect to stationary member 115a and 114, spring 112 is also subjected to lower torsional forces.

FIGS. 2 and 3 also show the sources of the non-linearity that contribute to signal distortion. First, springs 10 and 12 receive pressure from opposite sides of the spring by contact ring 12 and pressure ring 16. The minute movement of the pressure ring under the influence of the gravitational forces from the coil form introduces some non-linearity into the system. In addition, frictional forces on the spring are not symmetrical. For example, spring 10 is bound on its upper side by contact ring 12 and on its lower side by pole piece 14. Whereas, spring 12 is bound on its upper side by pole piece 20 and on its lower side by pressure ring 116. These slight differences in the frictional forces introduce significant distortion in any resulting signals. Even the inclusion of an insulating material between spring 10 and pole piece 14 does not equalize the forces on the springs. To the contrary, the addition of this material increases the difference in the frictional forces distributed on the spring and thus increases the non-linearity of the system.

The material used for the washers is not critical, nor is the arrangement of the washers around the spring. For example, it is not critical that one of the washers is conducting and the other insulating. Both could be of the same material as long as the same frictional effect is imposed on the top spring as is imposed on the bottom spring.

Isolation washers made from a polyester, a polyamide, a fluorinated polymer, polypropylene, polyethylene, or polybutylene will function properly.

Referring now to the axial shock absorbing portion of the disclosed geophone, leaf springs 140 and 142 are lodged between housing 102 and top and bottom housing closing members, respectively, in order to prevent coil form 108 from colliding with the top and bottom housing closure members and, thus, reduce the amount of axial shock imparted on the coil form during rough handling.

Figure 7:
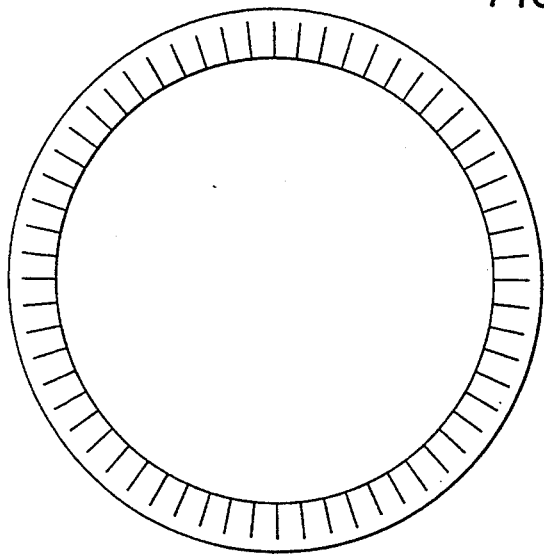
FIG. 7 is a plan view of a leaf spring utilized in the axial shock absorber of this invention.
Figure 8:
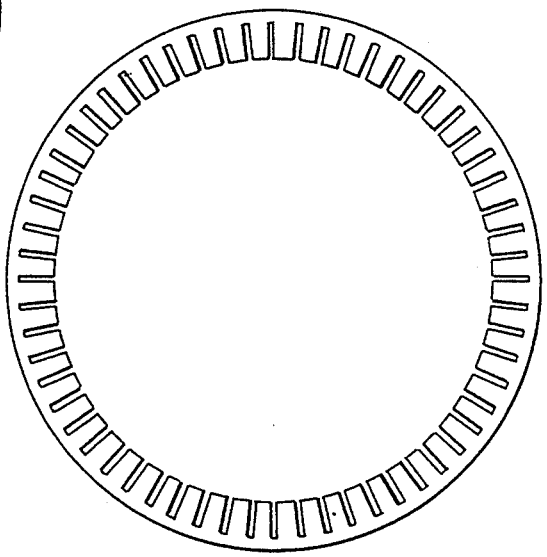
FIG. 8 is a plan view of an alternate leaf spring utilized in the axial shock absorber of this invention.
Figure 9:
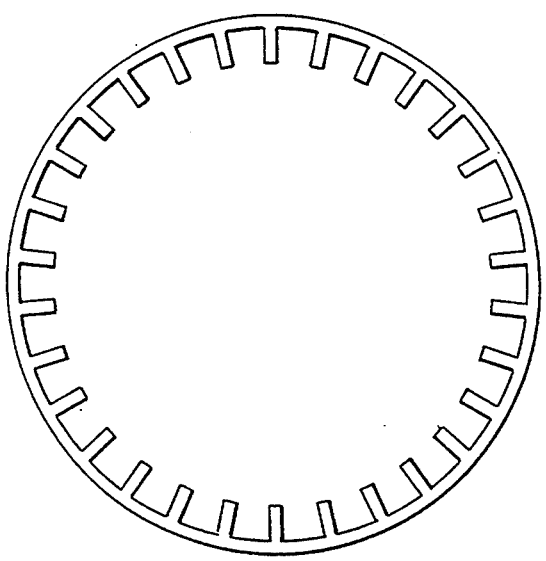
FIG. 9 is a plan view of an another alternate leaf spring utilized in the axial shock absorber of this invention.

FIGS. 7, 8 and 9 show examples of three types of leaf springs that can be used in this invention. Radial fingers extend inwardly from the housing above and below the coil form. These fingers will decelerate the soft aluminum coil form and, thus, reduce the damage to the main suspension spring. The main suspension spring and the tension thereon determine the natural frequency of the geophone. Retainer rings 124 and 125 and shoulders 108a and 108b function together to establish the tension on the main suspension. The impact of the ends of the coil form continuously colliding with the top and bottom housing closure members will either tighten or loosen the tension of the retainer spring on the main suspension springs and cause excessive frequency shifts. The leaf spring shock absorber, thus, reduces the amount of frequency shift by absorbing the shock to the main suspension system.

In the preferred embodiment, a spring such as that shown in FIG. 7 having 60 fingers, located at 6° intervals is used. The spring is made from 0.004 inch thick beryllium copper 25, full hard. However, any type of spring material and any number of fingers can be used. It is not necessary that the leaf spring have fingers. A solid piece of soft material could be used.

Although the leaf springs are used for deceleration purposes, rubber or other resilient material could be placed on the housing above and below the coil forms ends or on the coil form itself to perform the same function.

All the components of the claimed invention are readily available standard components, the size and material of which can easily be determined by one of ordinary skill in the art for any given configuration.

Although the invention described above is embodied in a rotational type geophone, this invention could also be used with a pigtail-type geophone.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A geophone comprising a cylindrical housing having a longitudinal axis, a cylindrical magnet assembly including a magnet with poles pieces on both ends, top and bottom housing closure members for mounting said magnet assembly in the housing with its longitudinal axis along the longitudinal axis of the housing and an annular space between the magnet assembly and the housing, a cylindrical coil form located in the annular space, two disc-shaped springs positioned on opposite sides of the magnet assembly for supporting the coil form for longitudinal movement relative to the magnet assembly, said springs having an inner ring section and outer ring section connected to the coil form and spring arms that connect the inner and outer ring sections that cause a torsional force to be imposed on the inner ring section when the outer ring section moves with the coil form relative to the inner ring, a washer between the upper spring and the magnet assembly to allow rotation of the spring relative to the magnet assembly, a washer between the upper spring and said top closure member to allow rotation of the spring, a washer mounted between the lower spring and the bottom closure member to allow rotation of the spring relative to the bottom closure member, and a washer between the lower spring and the magnet assembly to allow rotation of the spring, so that said upper and lower springs are bound on the upper and lower sides by washers that are free to rotate relative to said magnet assembly, thereby allowing the inner annular ring of the springs to rotate in response to the torsional force, thereby reducing the stress imposed on the spring arms by the torsional force.

2. The geophone in accordance with claim 1, wherein the washer between the upper spring and the magnet assembly and the washer mounted between the lower spring and the bottom closure member are of the same material and the washer between the upper spring and said top closure member and the washer between the lower spring and the magnet assembly are of the same but different material from the other two washers.

3. The geophone in accordance with claim 1, wherein the washer between the upper spring and the magnet assembly and the washer mounted between the lower spring and the bottom closure member are made of an isolating material and the washer between the upper spring and said top closure member and the washer between the lower spring and the magnet assembly are made of conducting material.

4. The geophone in accordance with claim 3, wherein the isolation washers have lower coefficients of friction than the pole pieces.

5. The geophone in accordance with claim 3, wherein the isolation washers are made from a material selected from the group consisting of a polyester, a polyamide, a fluorinated polymer, polypropylene, polyethylene, and polybutylene.

6. The geophone in accordance with claim 3, additionally comprising a contact ring positioned between the top housing closure member and the washer between the upper spring and said top closure member and a pressure ring positioned between the magnet assembly and the washer between the lower spring and the magnet assembly.

7. A geophone comprising a cylindrical housing having a longitudinal axis, a cylindrical magnet assembly including a magnet with poles pieces on both ends, top and bottom housing closure members for mounting said magnet assembly in the housing with its longitudinal axis along the longitudinal axis of the housing and an annular space between the magnet assembly and the housing, a cylindrical coil form located in the annular space, two disc-shaped springs positioned on opposite sides of the magnet assembly for supporting the coil form for longitudinal movement relative to the magnet assembly, said springs having an inner ring section supported by the magnet assembly and bottom closure member and outer ring section connected to the coil form and spring arms that connect the inner and outer ring sections that cause a torsional force to be imposed on the inner ring section when the outer ring section moves with the coil form relative to the inner ring, an upper isolation washer between the inner ring section of the upper spring and the magnet assembly to allow rotation of the spring relative to the magnet assembly, a lower isolation washer mounted between the inner ring section of the lower spring and the bottom closure member to allow rotation of the spring relative to the bottom closure member, an upper electrically conducting washer between the upper spring and said top closure member to allow rotation of with the spring, and a lower electrically conducting washer between the lower spring and the magnet assembly to allow rotation of the spring, so that said upper and lower springs are bound on the upper and lower sides by washers that are free to rotate relative to said magnet assembly and the spring, thereby allowing the inner annular ring of the springs to rotate in response to the torsional force, thereby reducing the stress imposed on the spring arms by the torsional force.

8. The geophone in accordance with claim 7, wherein the upper and lower isolation washers have a low coefficients of friction.

9. The geophone in accordance with claim 7, wherein the upper and lower isolation washers are made from a material selected from the group consisting of a polyester, a polyamide, a fluorinated polymer, polypropylene, polyethylene, and polybutylene.

10. The geophone in accordance with claim 7, additionally comprising a contact ring positioned between the top housing closure member and the upper electrically conducting washer and a pressure ring positioned between the magnet assembly and the lower electrically conducting washer.

11. A geophone comprising a cylindrical housing with a longitudinal axis, a cylindrical magnet assembly including a magnet with poles pieces on both ends, top and bottom closure members for mounting said magnet assembly in the housing with its longitudinal axis along the longitudinal axis of the housing, in a fixed position relative to said housing, said magnet assembly being spaced from the housing to provide an annular space between the magnet assembly and the housing, a cylindrical coil form located in the annular space, two disc-shaped springs positioned on opposite sides of the magnet assembly for supporting the coil form for longitudinal movement relative to the magnet assembly, said springs having an inner ring section and outer ring section connected to the coil form and spring arms that connect the inner and outer ring sections, and resilient shock absorbers mounted between the coil form and the top and bottom closure members for preventing the coil form from directly contacting said top and bottom closure members during rough handling to reduce the shock imparted on said coil form.

12. The geophone in accordance with claim 11, wherein the resilient shock absorbers are leaf springs mounted between said top and bottom housing closure members and the housing.

13. The geophone in accordance with claim 11, wherein the resilient shock absorbers are pieces of rubber mounted between said top and bottom housing closure members and the housing.

* * * * *